United States Patent
Giordano et al.

(10) Patent No.: US 12,020,113 B2
(45) Date of Patent: Jun. 25, 2024

(54) MOUNTING SYSTEM FOR INDUSTRIAL DIGITAL BARCODE READER

(71) Applicant: ZEBRA TECHNOLOGIES CORPORATION, Lincolnshire, IL (US)

(72) Inventors: Joseph D. Giordano, Bayville, NY (US); Steven D. Sieckowski, Port Jefferson, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 22 days.

(21) Appl. No.: 17/825,940

(22) Filed: May 26, 2022

(65) Prior Publication Data

US 2023/0385577 A1     Nov. 30, 2023

(51) Int. Cl.
| | | |
|---|---|---|
| *G06K 7/10* | (2006.01) | |
| *A47F 9/04* | (2006.01) | |
| *B21D 5/06* | (2006.01) | |
| *B21D 28/02* | (2006.01) | |
| *B21D 35/00* | (2006.01) | |

(52) U.S. Cl.
CPC ............ *G06K 7/1098* (2013.01); *A47F 9/046* (2013.01); *B21D 5/06* (2013.01); *B21D 28/02* (2013.01); *B21D 35/001* (2013.01)

(58) Field of Classification Search
CPC ........... G06K 7/10881; G06K 7/10722; G06K 7/1098; G06K 2007/10524; G06K 15/00; G06K 7/109; A47F 9/046; B21D 5/06; B21D 28/02; B21D 35/001
See application file for complete search history.

(56) References Cited

U.S. PATENT DOCUMENTS

| | | | | |
|---|---|---|---|---|
| 5,232,185 A | * | 8/1993 | Schorr ............... | G06K 7/10871 |
| | | | | 248/220.21 |
| 2014/0166755 A1 | * | 6/2014 | Liu .................... | G06K 7/10722 |
| | | | | 235/440 |

FOREIGN PATENT DOCUMENTS

| | | | | |
|---|---|---|---|---|
| EP | 2668878 B1 | * | 1/2022 | ............. A47F 9/046 |
| WO | WO-2011085362 A1 | * | 7/2011 | ......... G06K 7/10722 |

OTHER PUBLICATIONS

Serasinghe, "Intelligent Retail Checkout Management System" (Year: 2016).*
Sassasni et al., "Commercial Security Scanning: Point-on-Sale (POS) Vulnerability and Mitigation Techniques" (Year: 2019).*

* cited by examiner

*Primary Examiner* — Thien T Mai
(74) *Attorney, Agent, or Firm* — Yuri Astvatsaturov

(57) ABSTRACT

Scanning assemblies are disclosed herein. An example scanning assembly includes a slot scanner and a mounting system. The slot scanner includes an imaging assembly configured to capture an image frame appearing in a field of view (FOV) and a housing having a cavity configured to accommodate the imaging assembly. The mounting system includes a flange member at least partially surrounding an opening formed within the mounting system, and at least two support arms extending from the flange. The at least two support arms engage a portion of the housing of the slot scanner to retain the slot scanner within the opening formed by the flange.

20 Claims, 6 Drawing Sheets

MOUNTING SYSTEM FOR INDUSTRIAL DIGITAL BARCODE READER

BACKGROUND

Barcode and other scanning devices generally capture images within a given field of view (FOV). Barcode readers may be provided to be used in a various orientations depending on environments. For example, some barcode readers may be implemented in a generally horizontal orientation to be used in countertop point of sale checkout environments, and may be used to create a flat plane with which to pass items over for scanning purposes. Such scanning devices may be installed within a cavity of a mounting bucket having a flange used to hang the bucket within an opening or cutout in the countertop surface.

Existing mounting buckets typically include a floor member to allow the device to rest thereon. However, this requires an extra piece of material that must be separately installed during manufacturing, which may add complexity and costs. For example, mounting buckets constructed from metals require the additional floor member to be welded or otherwise coupled with the remainder of the body and thus requires at least one additional assembly step. Some systems may use mounting buckets constructed from alternative materials such as polymers. While such mounting buckets may be more readily manufactured, they oftentimes cannot meet durability requirements required in horizontal scanning environments where products are repeatedly slid across the flange surface.

Further, such systems incorporating floor members may interfere with power cords and/or other cabling while creating potential friction points that may degrade such cabling over time. Additionally, in some embodiments, garbage receptacles may be placed below such scanning devices, which may result in trash or other debris contacting the cabling. Further, routing of the cabling along with other assembly and disassembly of these devices may be time consuming.

Accordingly, there is a need for improved accessories having improved functionalities.

SUMMARY

Scanning assemblies are disclosed herein. An example scanning assembly includes a slot scanner and a mounting system. The slot scanner includes an imaging assembly configured to capture an image frame appearing in a field of view (FOV) and a housing having a cavity configured to accommodate the imaging assembly. The mounting system includes a flange member at least partially surrounding an opening formed within the mounting system, and at least two support arms extending from the flange. The at least two support arms engage a portion of the housing of the slot scanner to retain the slot scanner within the opening formed by the flange.

In a variation of this embodiment, the flange may include a generally planar surface that may be flush-mounted within a countertop scanning surface. In some of these examples, at least one of the at least two support arms includes a positioning tab adapted to align the mounting system within the countertop scanning surface.

In some forms, the scanning assembly may further include a window adapted to cover at least a portion of the cavity of the housing. The window may form a continuous planar surface with the flange member of the mounting system. Further, the window may be operably coupled with a removable platter.

In some examples, the mounting system is formed from a single sheet of metallic material. Further, the mounting system may be formed via a progressive stamping and bending process. In some of these examples, the mounting system may be formed without the use of welds of fasteners.

In some variations of these embodiments, at least one of the at least two support arms of the mounting system includes a ledge that supports a portion of the housing. the ledge may include a housing engaging tab that engages a groove formed on the housing. Further, the groove may be in the form of a receiving member that positions the housing relative to the ledge.

In some examples, the mounting system may include an open bottom portion. In some examples, each of the at least two support arms is bent at an angle between approximately 60° and approximately 120° relative to a plane defined by the flange member. Further, in some examples, each of the at least two support arms is positioned on a different side of the housing.

In accordance with a second embodiment, a mounting system for a scanning device includes a flange member at least partially surrounding an opening formed within the mounting system and at least two support arms extending from the flange. The at least two support arms are adapted to engage a portion of a slot scanner to retain the slot scanner within the opening formed by the flange.

In accordance with a third embodiment, an approach for manufacturing a mounting system formed from a single sheet of metallic material is provided that includes providing a flat metallic sheet, removing an inner portion from the flat metallic sheet to define a flange member and at least two support arms extending from the flange member, and performing a progressive bending process. The progressive bending process causes each of the at least two support arms to be bent at an angle between approximately 60° and approximately 120° relative to a plane defined by the flange member.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
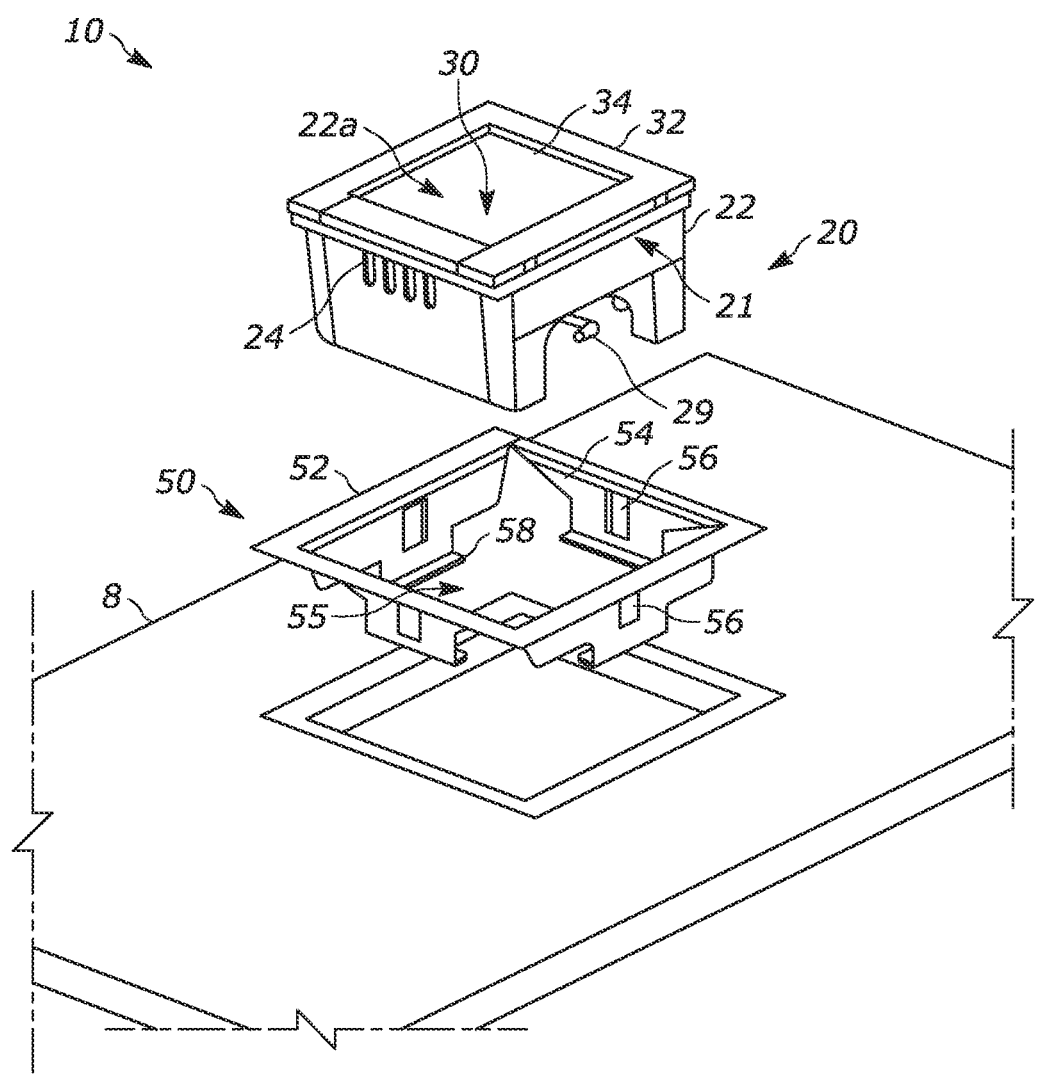
FIG. 1 illustrates an exploded perspective view of an example scanning assembly in an example environment in accordance with various embodiments.
Figure 2:
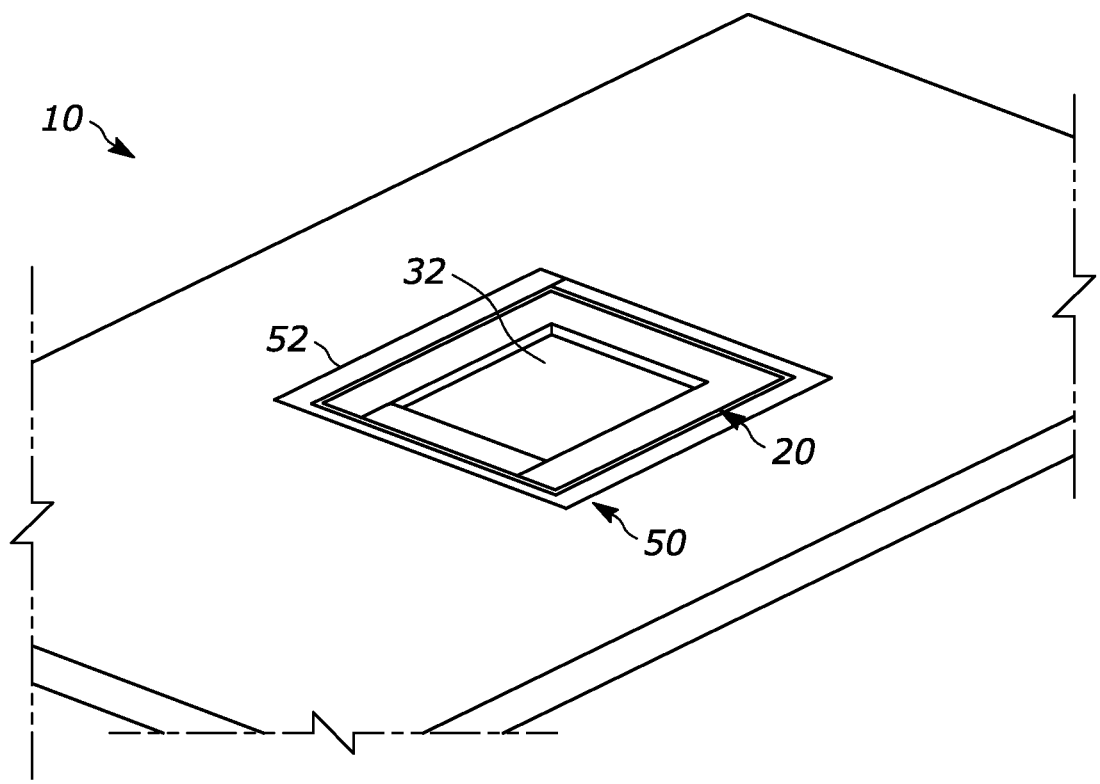
FIG. 2 illustrates an upper perspective view of the example scanning assembly of FIG. 1 in an installed configuration in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a scanning assembly is provided that includes a flanged mounting system for hanging a scanning device inside a countertop cutout. The support structure does not use a "floor" to support the scanner, but instead includes a number of flanges or protrusions that retain the scanning device. Such a design is cost effective when compared with other designs due to being manufactured from a single piece of sheet metal, which provides the additional benefit of being resistant to damage from scanned items as compared with mounting systems constructed from polymers or similar materials.

Figure 3:
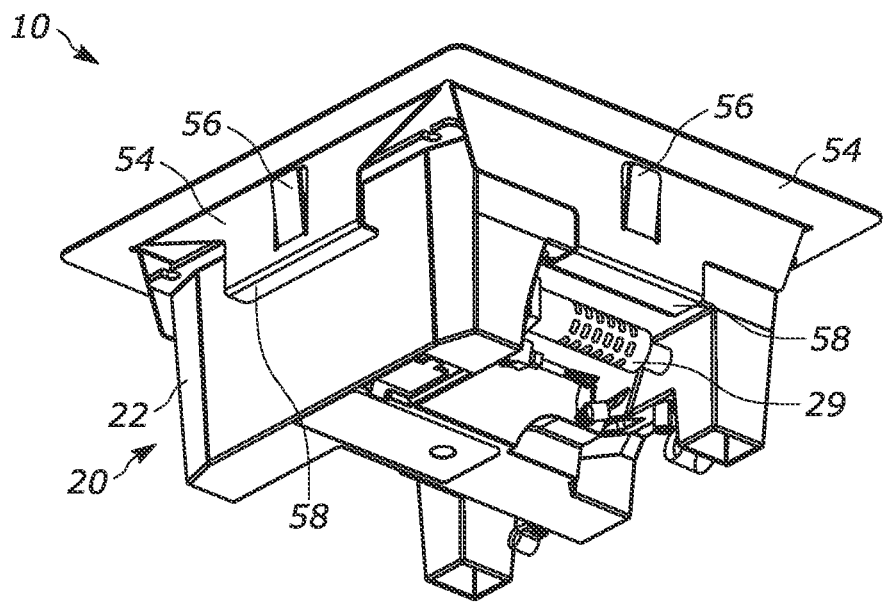
FIG. 3 illustrates a lower perspective view of the example scanning assembly of FIGS. 1 and 2 in accordance with various embodiments.
Figure 4:
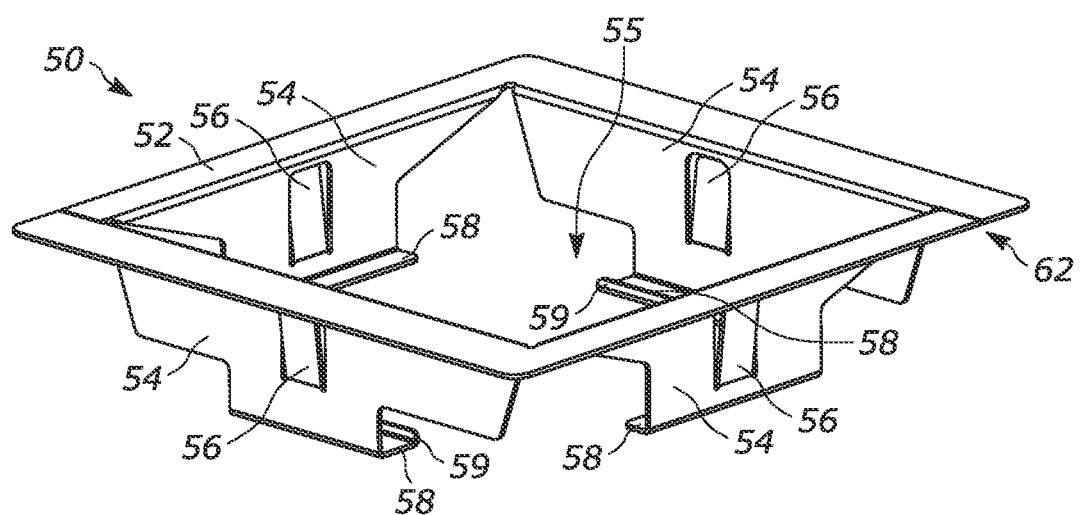
FIG. 4 illustrates a front perspective view of an example mounting system of the example scanning assembly of FIGS. 1-3 in accordance with various embodiments.
Figure 5:
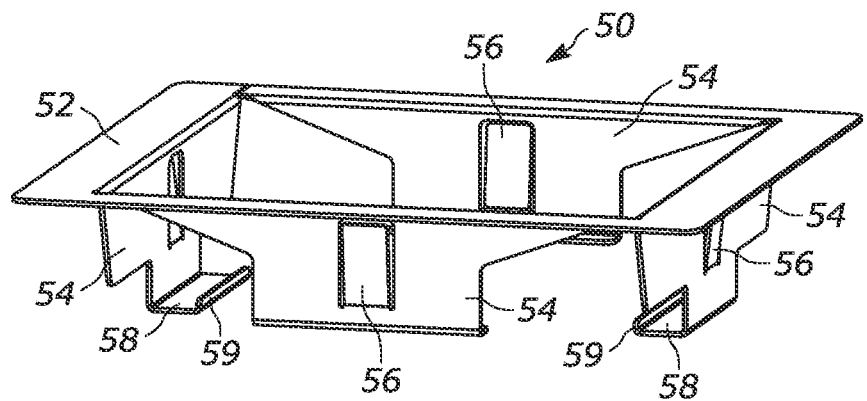
FIG. 5 illustrates a side perspective view of the example mounting system of FIG. 4 in accordance with various embodiments.
Figure 6:
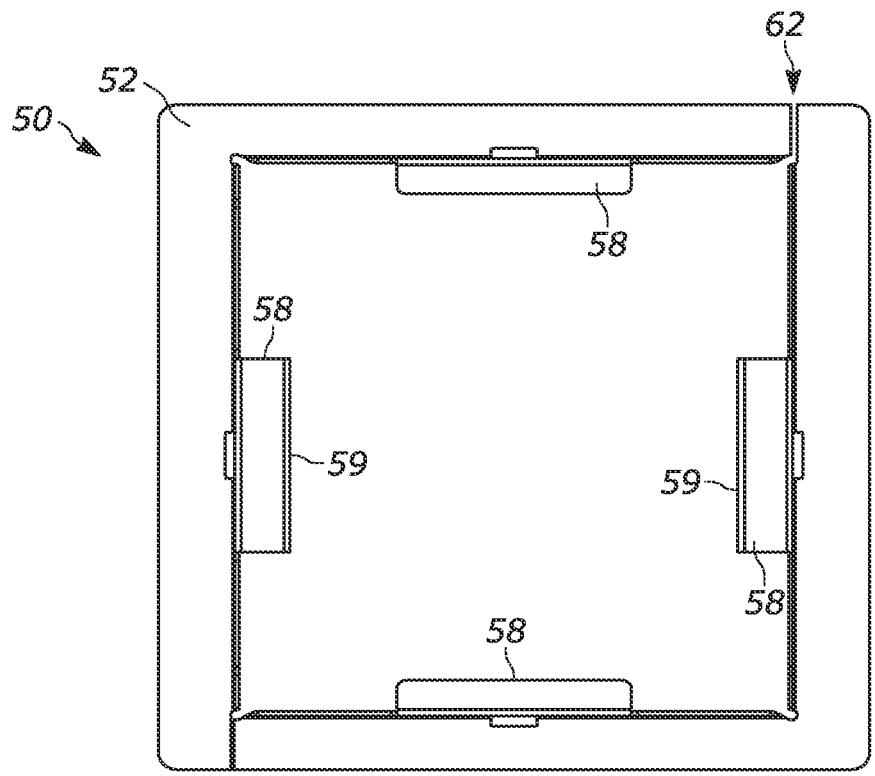
FIG. 6 illustrates a top plan view of the example mounting system of FIGS. 4 & 5 in accordance with various embodiments.
Figure 9:
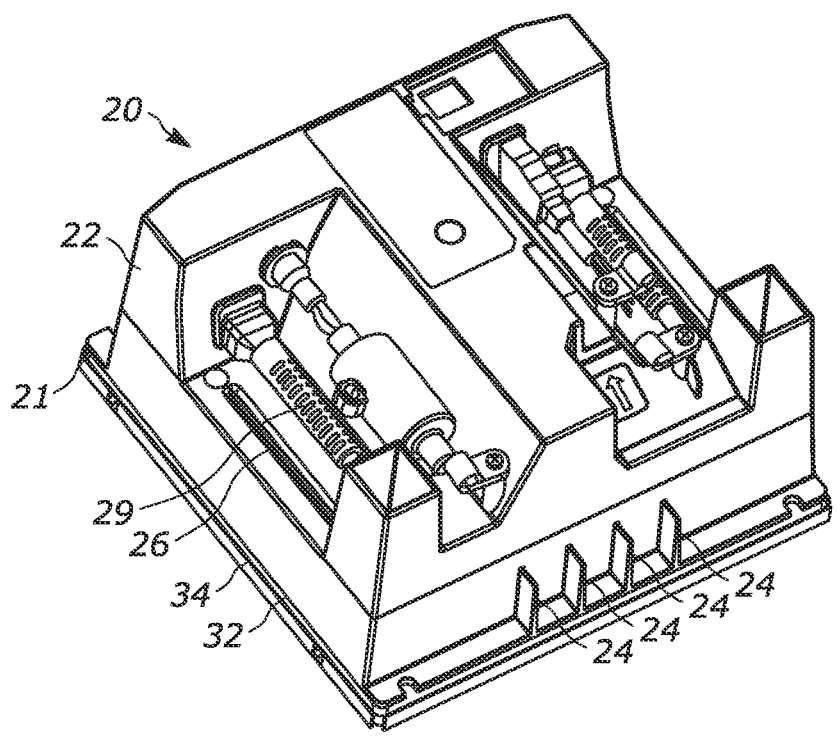
FIG. 9 illustrates a lower perspective view of an example slot scanner of the example scanning assembly of FIGS. 1-8 in accordance with various embodiments.

Turning to the figures, reference numeral 10 generally identifies a scanning assembly that includes a slot scanner 20 and a mounting system 50. The slot scanner 20 includes a housing 22 having a cavity 22a and an imaging assembly 30. The housing 22 is configured to accommodate opto-mechanics including, for example, the imaging assembly 30 and any other components such as, for example, circuit boards, a controller, and an image decoder. The housing 20 may further include a ledge 21 that at least partially surrounds the cavity 22a. The ledge 21 may act as a portion of a sealing arrangement to seal the entire perimeter of the housing 22. The slot scanner 20 may include a seal member such as a gasket (not illustrated) to further seal the housing 22 and to create a dust seal and/or an electrostatic discharge seal. As illustrated in FIGS. 3 & 9, a lower portion of the housing 22 includes a groove or receiving member 26 formed thereon. The housing 22 may be constructed from any number of suitable materials such as, for example, metals and/or polymers.

The imaging assembly 30 (and other components) may be operably coupled with the circuit board via any number of suitable approaches. The imaging assembly 30 is configured to capture an image frame appearing in a FOV and can include any number of image sensors including any number of photosensitive elements. In examples where the slot scanner 20 is equipped with a decoder, such a component may be communicatively coupled with the imaging assembly 30 to decode a barcode captured in an image by the imaging assembly 30. As illustrated in FIGS. 3 & 9, the slot scanner 20 may use any number of cables 29 to transmit data and/or power between the slot scanner 20 and any desired external devices.

As illustrated in FIG. 1, a window 32 is provided to cover at least a portion of the cavity 22a. The window 32 is generally supported by the ledge 21 and is configured to allow light to pass from the product-scanning region and into the cavity 22a of the housing 22. The window 32 may be constructed from any number of suitable materials such as, for example, sapphire and/or a glass having a diamond like carbon coating capable of resisting scratching or scuffing damage when items (e.g., products) are slid across during the item scanning process.

In the illustrated example and as previously noted, the window 32 is configured to be positioned on the ledge 21 of the housing 22. In some examples, the window 32 may be a part of a removable platter 34 that is flush with a counter surface 8. Accordingly, items desired to be scanned may slide across these surfaces without being bumped or otherwise jostled. The platter 34 may further include a directional indicator to provide a user with a visual indication of the scan direction.

In some examples, the mounting system 50 forms a "tub" having a cavity dimensioned to at least partially accommodate the housing 22. In the illustrated example, the mounting system 50 includes a flange member 52 that rests on the counter 8. Accordingly, the counter 8 is configured to support the weight of the mounting system 50 as well as any components disposed therein. The mounting system 50 may further include any number (e.g., two or more) support arms 54 that extend from the flange member 52 that cooperate to define an open cavity 55. The mounting system 50 may be dimensioned to fit in standard 6"×6" counter openings for horizontal mini slot scanners. Generally, the support arms 54 are provided to engage a portion of the housing 22 of the slot scanner 20 to retain the slot scanner 20 within the opening formed by the flange member 52. Further, in some examples, the support arms 54 may be used to center the housing 22 within the cavity 55 due to the smaller size of the housing 22 (e.g., approximately 5.4"×6"). Accordingly, in some examples, the support arms 54 may be used to retain smaller slot scanners.

As previously noted, the mounting system 50 is constructed from a single sheet of metallic material such as, for example, stainless steel. Such a material provides ample resistance to damage from products being slid across the flange member 52. Further, the mounting system 50 may be formed using a progressive stamping and bending process that advantageously does not require the use of fasteners, welds, or other elements to couple a lower, floor portion of the mounting system. Instead, by creating an open cavity 55 (i.e., one without a continuous sidewall and/or floor portion), the mounting system 50 may accommodate housings 22 of varying depths while allowing the cables 29 to freely hang below the mounting system 50. As such, installers needn't spend unnecessary time carefully routing the cables 29 underneath the counter 8 in an attempt to minimize contact between the cables 29 and the mounting system 50 or other items retained below the counter. Additionally, the cables 29 will not rub against the mounting system 50 during installation and/or removal, thus allowing for easier serviceability.

Figure 7:
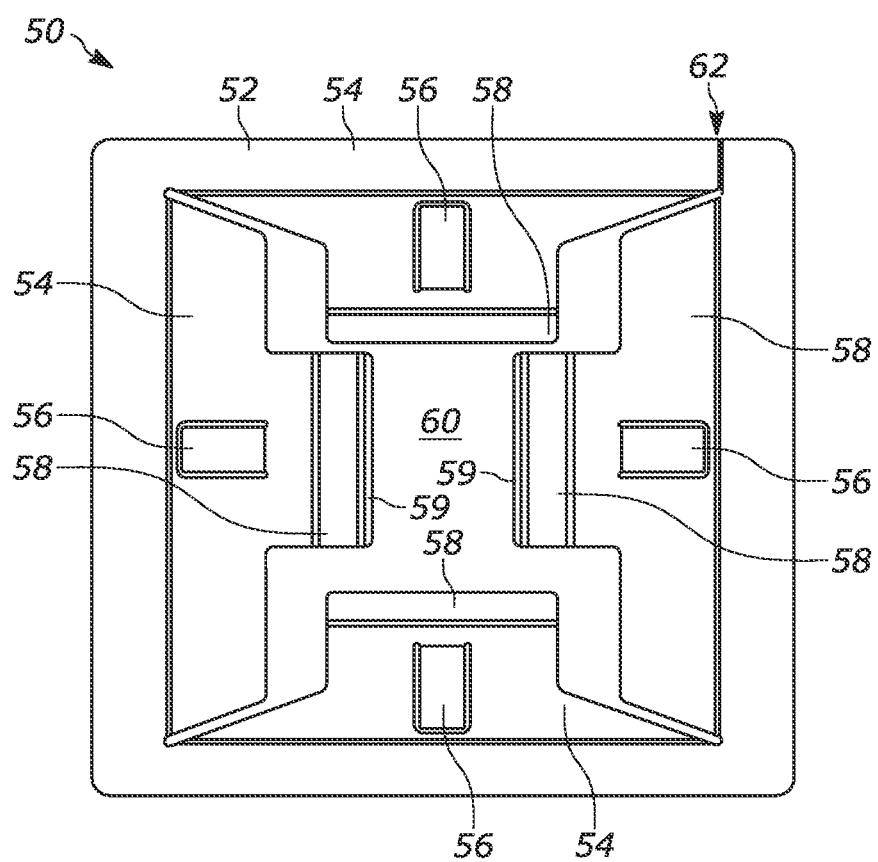
FIG. 7 illustrates a top plan view of the example mounting system of FIGS. 4-6 in an unformed configuration in accordance with various embodiments.
Figure 8:
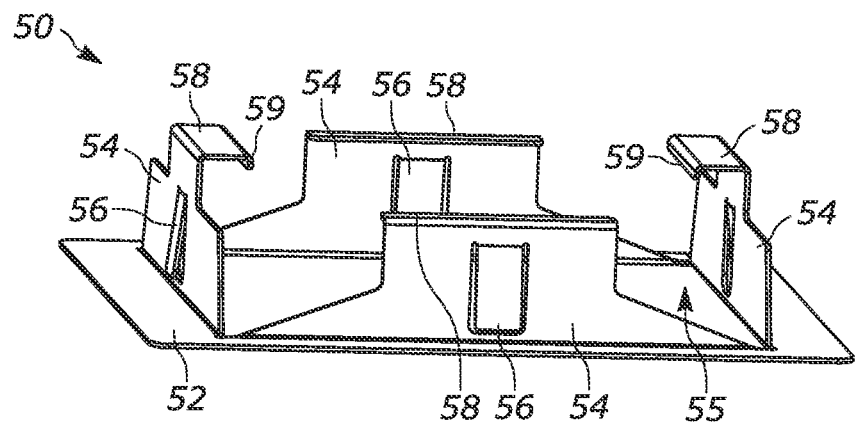
FIG. 8 illustrates a lower perspective view of the example mounting system of FIGS. 4-7 in accordance with various embodiments.

As previously noted, the mounting system 50 is constructed from a single sheet of metallic material. With reference to FIG. 7, the mounting system 50 is provided in an unbent/unformed configuration that illustrates locations where material is removed from the sheet. As an example, during a stamping and/or cutting process, an inner portion 60 may be removed from the sheet during a single stamping and/or cutting process, or alternatively, via a progressive stamping and/or cutting process as desired. This process or processes results in the formation of the support arms 54. The support arms 54 further include a positioning tab 56 which may also be formed during any step of the stamping and/or cutting process, as well as a ledge 58. As will be discussed in further detail below, the positioning tab 56 may assist with aligning the mounting system 50 within the opening of the counter 8.

As illustrated in FIG. 7, upon removing the inner portion 60 to define the support arms 54, none of these features interfere with each other in the unbent/unfolded shape. During the bending and/or folding process, each support arm 54 is bent downwardly relative to the flange member 52. More specifically, each support arm 54 may be bent at an angle between approximately 60° and approximately 120° relative to a plane defined by the flange member 52. In some examples, the support arms 54 may be bent so that the cavity 55 defined by the support arms 54 is smaller than the outer dimensions of the housing 22. In such arrangements, upon inserting the housing 22 into the cavity 55 defined by the support arms 54, the support arms 54 will flex outwardly and be biased towards the housing 22, therefore causing frictional engagement with the housing 22.

The mounting system 50 may be formed via any number of suitable approaches. For example, in some arrangements, the metallic sheet may be placed in a cutter for a progressive die that may perform necessary cutting and bending steps at desired locations in succession. In other examples, the metallic sheet may be cut using a chemical etching process. In such examples, a chemical deposit may be placed on specified areas, and a photon-actuated wavelength of light may activate the chemical, thereby forming a desired cut. In yet other examples, a laser or water jet may be used to cut the metallic sheet into the desired shape. Other examples are possible.

During the forming process, the positioning tabs 56 and ledges 58 are also formed. The positioning tabs may be bent outwardly relative to the support arms 54 so that they extend outwardly and thus may contact a portion of the counter 8 during insertion and placement within the opening. The ledges 58 may be bent to form a generally horizontal surface (i.e., a surface that is generally parallel to the plane formed by the flange member 52) that a portion of the housing 22 may rest on. More specifically, as illustrated in FIGS. 1, 3, and 9, the housing 22 may include any number of mounting protrusions 24 or other members which may engage (i.e., rest upon) the ledges 58. Each of the support arms 54 may be positioned on a different side of the housing 22.

With reference to FIGS. 4-9, a number of the support arms 54 may include an additional bend to assist with coupling the mounting system 50 with the housing 22. More specifically, a housing engaging tab 59 is provided on the ledge 58 that is bent relative to the ledge 58. In the illustrated examples, the housing engaging tab 59 is bent at an angle of approximately 90° relative to a plane defined by the ledge 58. During installation of the slot scanner 20, the grooves 26 are aligned with the housing engaging tab 59 when inserting the slot scanner into the mounting system 50. The housing engaging tab 59 is inserted into the groove 26 to provide additional mounting security by retaining the housing 22 and preventing the metal support arms 54 from flexing outwardly relative to the housing 22. In some examples, a pin or other securement feature (not illustrated) may be provided to further couple the slot scanner 20 with the mounting system 50.

As previously noted, because the mounting system 50 lacks a complete "floor" and solid sidewalls surrounding the housing 22, any desired cabling 29 may be easily routed underneath the counter as needed. Such a system reduces overall installation time and reduces a likelihood of the cables 29 being damaged during installation and/or use.

In some examples, the scanning assembly 10 may be installed by placing and securing the mounting system 50 within the opening formed on the counter 8 and subsequently placing the housing 22 therewithin. During insertion, the positioning tabs 56 may contact a sidewall of the opening formed on the counter 8, thereby centering and positioning the mounting system 50 relative to the counter 8. In some examples, the housing 22 may include a handle or handles (not illustrated) that a user may grasp to be lowered into or lifted from the mounting system 50. Last, the window 32 (and any platter coupled therewith) may be placed over the housing 22 and/or the mounting system 50. In some examples, when the mounting system 50 is fully inserted into the opening formed on the counter 8, the flange member 52 (and any portions of the housing 22 and the window 32) may be flush-mounted with the countertop scanning surface. In some examples, the flange member 52 may include a leading chamfer (not illustrated) that assists with sliding objects along the flange member 52 to be scanned.

It is to be appreciated that the scanning assembly 10 may include any number of additional components and/or features to assist in operation thereof. For example, in some forms, the flange member 52 may include a cut or opening 62 that causes the flange member to be a discontinuous loop. Such a formation advantageously ensures that the flange member 52 does not radiate or create unwanted interference with transmissive components.

Further, it is to be appreciated that the slot scanner 20 may include any number of additional components to assist in operation thereof. For example, the slot scanner 20 may include any number of interface elements that a user may interact with in the form of a button or buttons, an illumination member or members, a sound generating device (e.g., a speaker or a beeper), and the like. Other examples are possible.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A scanning assembly, comprising:
  a slot scanner including:
    an imaging assembly configured to capture an image frame appearing in a field of view (FOV);
    a housing having a cavity configured to accommodate the imaging assembly;
  a mounting system including:
    a flange member at least partially surrounding an opening formed within the mounting system, and
    at least two support arms extending from the flange, the at least two support arms adapted to engage a portion of the housing of the slot scanner to retain the slot scanner within the opening formed by the flange member,
    wherein at least one of the at least two support arms of the mounting system includes a ledge adapted to support a portion of the housing, and
    wherein the ledge includes a housing engaging tab adapted to engage a groove formed on the housing.

2. The scanning assembly of claim 1, wherein the flange comprises a generally planar surface adapted to be flush-mounted within a countertop scanning surface.

3. The scanning assembly of claim 2, wherein at least one of the at least two support arms includes a positioning tab adapted to align the mounting system within the countertop scanning surface.

4. The scanning assembly of claim 1, further comprising a window adapted to cover at least a portion of the cavity of the housing.

5. The scanning assembly of claim 4, wherein the window forms a continuous planar surface with the flange member of the mounting system.

6. The scanning assembly of claim 4, wherein the window is operably coupled with a removable platter.

7. The scanning assembly of claim 1, wherein the mounting system is formed from a single sheet of metallic material.

8. The scanning assembly of claim 7, wherein the mounting system is formed via a progressive stamping and bending process.

9. The scanning assembly of claim 7, wherein the mounting system is formed without the use of welds or fasteners.

10. The scanning assembly of claim 1, wherein the groove formed on the housing comprises a receiving member adapted to position the housing relative to the ledge.

11. The scanning assembly of claim 1, wherein the mounting system includes an open bottom portion.

12. The scanning assembly of claim 1, wherein each of the at least two support arms is bent at an angle between approximately 60° and approximately 120° relative to a plane defined by the flange member.

13. The scanning assembly of claim 1, wherein each of the at least two support arms is positioned on a different side of the housing.

14. A mounting system for a scanning device comprising:
  a flange member at least partially surrounding an opening formed within the mounting system, and
  at least two support arms extending from the flange, the at least two support arms adapted to engage a portion of a slot scanner to retain the slot scanner within the opening formed by the flange,
  wherein each of the at least two support arms of the mounting system includes a support ledge adapted to support a portion of a scanning device, and
  wherein the support ledge includes a housing engaging tab.

15. The mounting system of claim 14, wherein the flange comprises a generally planar surface adapted to be flush-mounted within a countertop scanning surface.

16. The mounting system of claim 15, wherein at least one of the at least two support arms includes a positioning tab adapted to align the mounting system within the countertop scanning surface.

17. The mounting system of claim 14, wherein the mounting system is formed from a single sheet of metallic material.

18. The mounting system of claim 17, wherein the mounting system is formed via a progressive stamping and bending process.

19. The mounting system of claim 18, wherein when the mounting system is in an unbent configuration, the at least two support arms and the flange member do not overlap.

20. The mounting system of claim 14, wherein the mounting system includes an open bottom portion.

* * * * *